United States Patent
Bunya et al.

(10) Patent No.: US 6,725,711 B2
(45) Date of Patent: Apr. 27, 2004

(54) ON VEHICLE TIRE AIR PRESSURE DETECTING DEVICE AND CAST WHEEL MOUNTING THE DEVICE

(75) Inventors: Osamu Bunya, Saitama (JP); Toshio Yamagiwa, Saitama (JP); Tomoyuki Harada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/874,216

(22) Filed: Jun. 6, 2001

(65) Prior Publication Data

US 2002/0002862 A1 Jan. 10, 2002

(30) Foreign Application Priority Data

Jun. 6, 2000 (JP) ......................... 2000-169342

(51) Int. Cl.⁷ .................... B60C 15/00; B60B 21/10
(52) U.S. Cl. .................. 73/146; 73/146.3; 152/382; 152/323
(58) Field of Search .................. 73/146, 146.2, 73/146.3, 146.4, 146.5; 152/382, 323

(56) References Cited

U.S. PATENT DOCUMENTS 4,235,184 A * 11/1980 Schiavone ............... 116/34 R
5,452,608 A * 9/1995 Green ...................... 73/146.8
5,844,131 A    12/1998 Gabelmann et al.
6,298,891 B1 * 10/2001 Harris ........................ 152/382
6,339,956 B1 *  1/2002 Huinink et al. .............. 73/146
6,474,385 B1 * 11/2002 Bonning et al. .......... 152/381.4

FOREIGN PATENT DOCUMENTS

| DE | 39 30 095 A | 3/1991 |
| DE | 195 29 289 A | 2/1997 |
| DE | 196 26 446 A | 1/1998 |
| DE | 36 40 468 A | 6/1998 |
| JP | A1044726 | 2/1998 |

* cited by examiner

Primary Examiner—Edward Lefkowitz
Assistant Examiner—Andre Allen
(74) Attorney, Agent, or Firm—Birch, Stewart, Kolasch & Birch, LLP

(57) ABSTRACT

A rim drop section dented in a shape of a ring is provided on an inner side of a bead seat section of a rim for holding a bead section of a tire. Furthermore, a recessed section is provided on this rim drop section, and a detecting device main body of a tire air pressure detecting device is accommodated in this recessed section. When a tire is assembled on a cast wheel by utilizing a tire changer or the like, or when the tire is removed from the cast wheel, the bead sections of the tire are prevented from interfering with an air pressure sensor, and damaging of the air pressure sensor is prevented.

16 Claims, 3 Drawing Sheets

ON VEHICLE TIRE AIR PRESSURE DETECTING DEVICE AND CAST WHEEL MOUNTING THE DEVICE

BACKGROUND OF THE INVENTION

1. Field of the Invention

The present invention relates to an on vehicle tire air pressure detecting device and a cast wheel for mounting the device. In particular, the present invention is directed to an on vehicle tire air pressure detecting device and a cast wheel which is capable of preventing the device from interfering with bead sections of a tire when the tire is assembled to the cast wheel or the tire is removed from the cast wheel.

2. Description of Background Art

An on vehicle tire air pressure detecting device for detecting whether air pressure of a vehicular tire is low or not is known, for example, from Japanese Unexamined Patent Publication H10-44726, entitled "TIRE AIR PRESSURE WARNING DEVICE."

In FIG. 1 of the patent publication described above, a state in which a tire air pressure warning device which includes a transmission section 7 and a valve stem 10 are mounted on a wheel rim 1 by a nut 9 is disclosed.

In an art of the patent publication described above, if a case 2 of the tire air pressure warning device projects from a side of the tire, when assembling the tire on a wheel rim 1, bead sections of the tire interfere with the case 2.

SUMMARY OF THE INVENTION

Thus, an object of the present invention is to prevent bead sections of a tire from interfering with an on vehicle tire air pressure detecting device when assembling the tire on a cast wheel, or removing the tire from the cast wheel.

In order to achieve the object described above, a first aspect of the present invention is directed to a tire air pressure detecting device for detecting tire air pressure by an air pressure sensor mounted on a rim of a vehicular cast wheel, wherein a rim drop section, dented in a shape of a ring, is provided on inner sides of bead seat sections of a rim for holding bead sections of the tire. In addition, a recessed section is provided in the rim drop section, and an air pressure sensor is accommodated in the recessed section.

By accommodating the air pressure sensor in the recessed section of the rim, when the tire is assembled on the cast wheel by utilizing a tire changer or the like, or the tire is removed from the cast wheel, the bead sections of the tire are prevented from interfering with the air pressure sensor, and damage of the air pressure sensor is prevented.

According to a second aspect of the present invention, a tire air pressure detecting device is provided for detecting tire air pressure by an air pressure sensor mounted on a rim of a vehicular cast wheel, wherein the air pressure sensor is formed in a shape of a curve along an inner side surface of the rim.

By providing the air pressure sensor in the shape of a curve along the inner side surface of the rim, and by eliminating a projecting section of the air pressure sensor to the tire side, when the tire is assembled on the cast wheel, or is removed from the cast wheel, the bead sections of the tire are prevented from interfering with the air pressure sensor, and damage of the air pressure sensor is prevented.

According to a third aspect of the present invention, a weight section is integrally molded with the rim for being easily balanced with the air pressure sensor at a position shifted at an angle of 180° to a peripheral direction from a position where the air pressure sensor is mounted on the rim.

With the above construction of the integrally molded weight section, a cast wheel is easily balanced, the necessity to mount or to affix a specific weight to the cast wheel to balance the wheel is eliminated, and workability is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An embodiment of the present invention will now be explained with reference to the accompanying drawings. It should be noted that the drawings should be viewed in a direction in which the numerals are written.

Figure 1:
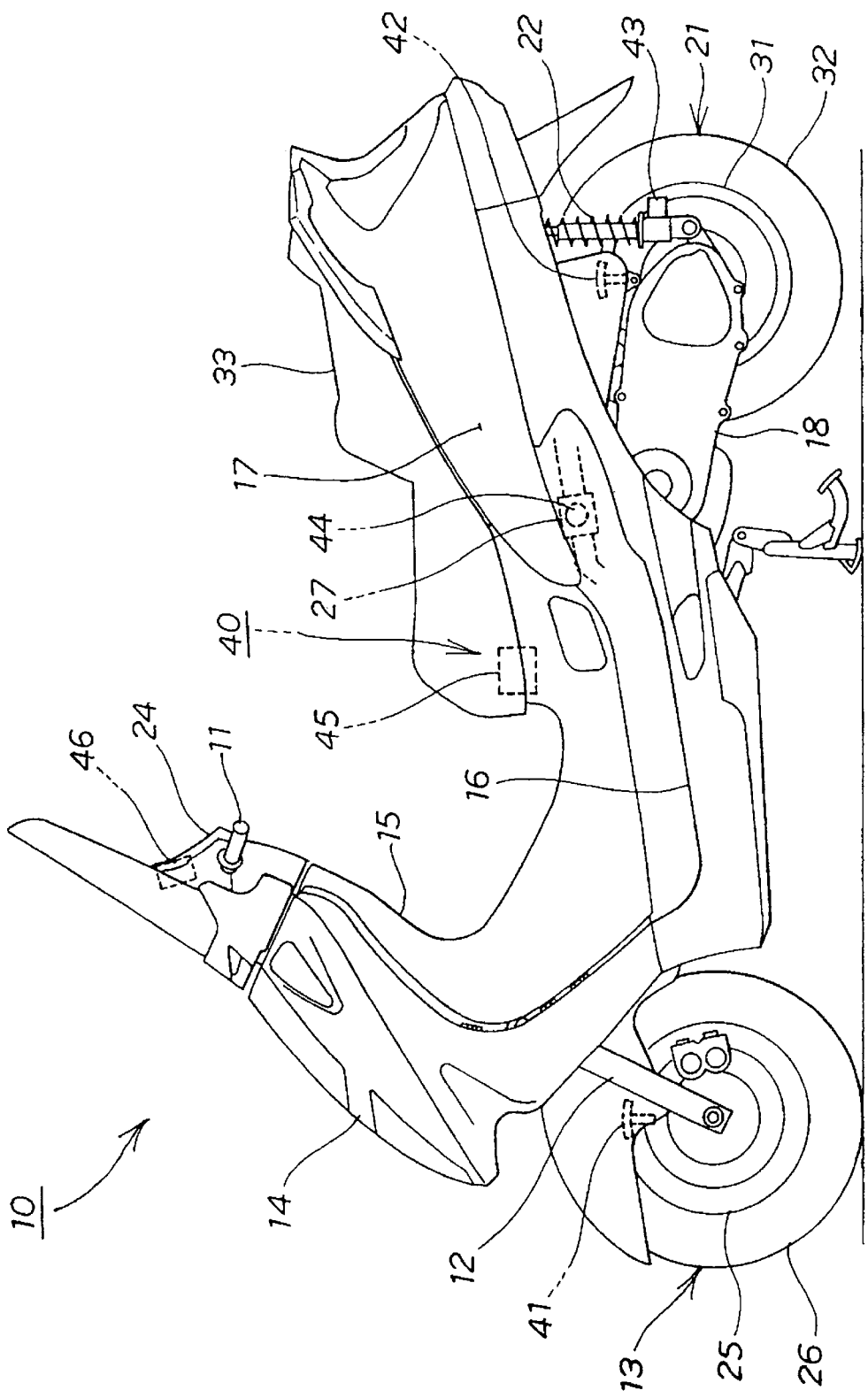
FIG. 1 is a side elevation view of a motorcycle provided with an on vehicle tire air pressure detecting device relating to the present invention.

FIG. 1 illustrates a side elevation view of a motorcycle provided with an on vehicle tire air pressure detecting device relating to the present invention. A motorcycle 10, as one example of a vehicle of the present invention, includes a handlebar 11, a front fork 12 and a front wheel 13 mounted freely steerably on a lower section of the handlebar 11. In addition, the motorcycle 10 includes a front cover 14 and a front inner cover 15 for covering a lower section of the handlebar 11 and an upper section of the front fork 12, a floor step 16 arranged rearward of a lower section of the front cover 14, a body cover 17 continued upward at a rear section of the floor step 16, a power unit 18 extending rearward from an inner side of the body cover 17, a rear wheel 21 mounted rearward of the power unit 18, and an air suspension device 22 respectively suspended between a rear end section of the power unit 18 and a vehicular body frame, not illustrated, inside the body cover 17.

Numeral 24 denotes a meter cover mounted on a handlebar 11, numerals 25 and 26 denote a wheel and a tire of the front wheel 13, numeral 27 denotes a carburetor for supplying fuel to an engine constituting the power unit 18, numerals 31 and 32 denote a wheel and a tire of the rear wheel 21, and numeral 33 denotes a seat.

An on vehicle tire air pressure detecting device 40 (hereinafter referred to as "air pressure detecting device 40") of the present invention, includes an air pressure detecting device 41 as an air pressure sensor for a front wheel for detecting air pressure of the tire 26 by mounting the device 41 on the wheel 25 of the front wheel 13. Furthermore, the air pressure detecting device 40 includes a tire air pressure detecting device 42 as an air pressure sensor for a rear wheel for detecting an air pressure of the tire 32 by mounting the device 42 on the wheel 31 of the rear wheel 21. Furthermore, an air suspension air pressure detecting device 43 is mounted on the air suspension device 22, for example, an engine output adjusting device 44 for adjusting an opening degree of a throttle by mounting the device 44 on a carburetor 27. In addition, a control device 45 operates a warning device, not illustrated, by receiving a signal transmitted from the tire air pressure detecting devices 41 and 42, and the air suspension air pressure detecting device 43, and controls the engine output adjusting device 44. Finally, a display device 46 is provided for displaying the air pressure of the tire 26 of the front wheel 13, the air pressure of the tire 32 of the rear wheel 21, and the air pressure of the air suspension device 22 by receiving signals from the control device 45, and the warning device.

The control device 45, for example, is arranged downward from the seat 33. Furthermore, the display device 46, for example, is mounted on a meter cover 24.

Figure 2:
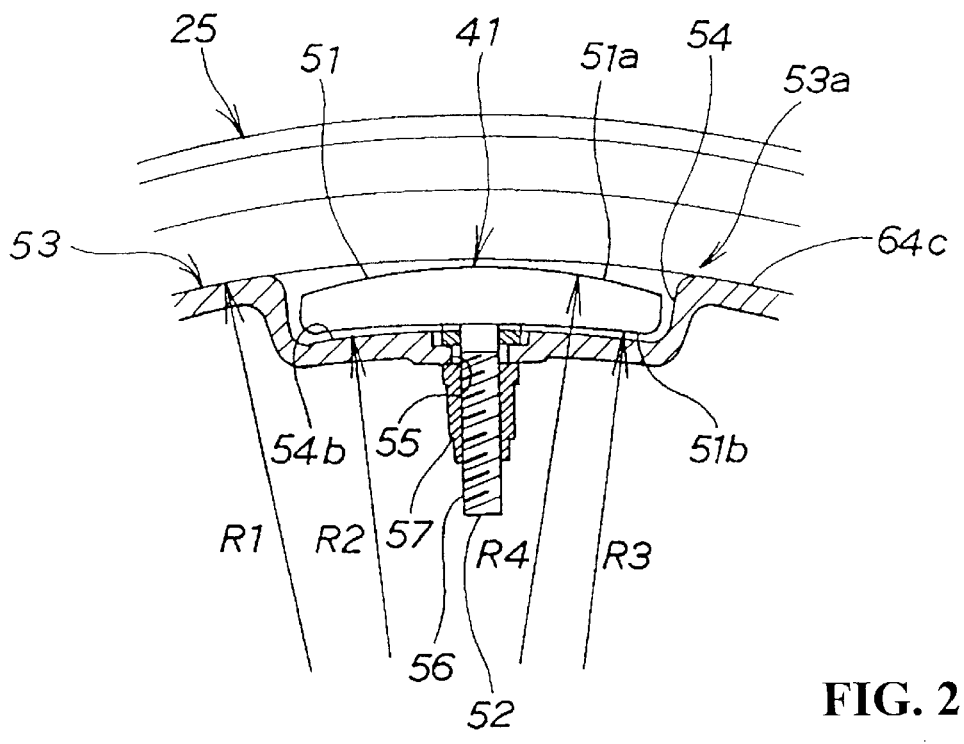
FIG. 2 is a first sectional view of a mounted state of a tire air pressure detecting device in an air pressure detecting device relating to the present invention.

FIG. 2 shows a first sectional view illustrating a mounting state of a tire air pressure detecting device 41 in an air pressure detecting device relating to the present invention. With regard to the tire air pressure detecting device 41 for the front wheel, this will be explained below. With regard to a tire air pressure detecting device 42 for the rear wheel, since the structure is the same as the tire air pressure detecting device 41 for the front wheel, the explanation in FIG. 2 and afterward will be abbreviated.

The tire air pressure detecting device 41 includes a detecting device main body 51, and a tire valve 52 mounted on the detecting device main body 51 for the purpose of opening only when supplying air to inside the tire 26 (refer to FIG. 1), and for the purpose of being closed so as not to allow air supplied to the inside of the tire 26 from flowing out to an outer section thereof. The detecting device main body 51 is arranged on a recessed section 54 provided on a bottom of a rim 53, the tire valve 52 is inserted into a valve inserting hole 55 opened on the bottom of the rim 53. Furthermore, a nut 57 is threaded into an external thread section 56 provided on an outer peripheral surface of the tire valve 52, and the tire air pressure detecting device 41 is mounted on the wheel 25.

Figure 3:
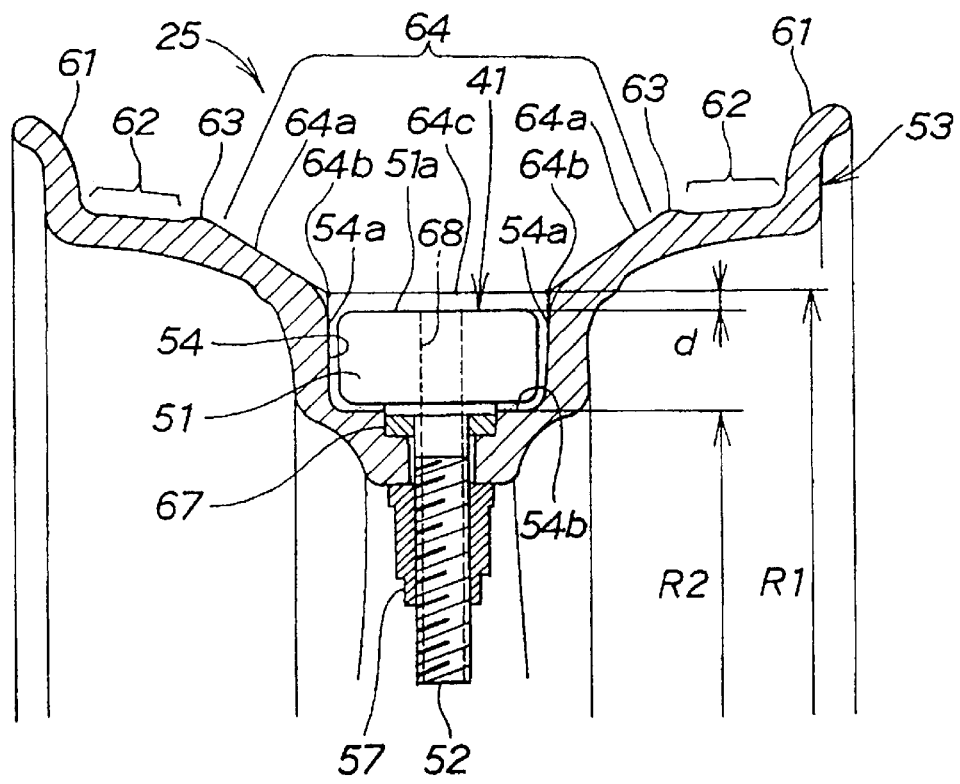
FIG. 3 is a second sectional view of a mounted state of a tire air pressure detecting device in an air pressure detecting device relating to the present invention.

FIG. 3 illustrates a second sectional view illustrating the mounted state of the tire air pressure detecting device in the air pressure detecting device relating to the present invention.

The wheel 25 includes flange sections 61 and 61, bead seat sections 62 and 62 provided on inner sides of the flange sections 61 and 61, hump sections 63 and 63 protuberantly molded on an inner side of the bead seat sections 62 and 62, a rim drop section 64 dented between the hump sections 63 and 63, and the recessed section 54 which is provided in the rim drop section 64.

The bead seat section 62 is a portion for holding a bead section of the tire 26 (refer to FIG. 1).

The hump section 63 is a projecting section in the shape of a ring for preventing the tire 26 from coming off from the bead seat section 62 of the wheel 25.

The rim drop section 64 is a portion for facilitating attachment/detachment of the tire 26 by deeply dropping the section 64.

The tire air pressure detecting device 41 is a device mounted on an outer surface 51a of the detection device main body 51 on the rim 53. The tire air pressure detecting device 41 is on an inner side by only an amount d from a bottom surface (described later) of the rim drop section 64. In addition, numeral 67 denotes a seal member for preventing air from leaking to an outer section from an air chamber inside the tire 26, numeral 68 denotes a communicating hole (blocked by a valve element not illustrated) provided inside the tire valve 52 for communicating an inside to an outside of the tire 26.

As explained in FIG. 2 and in FIG. 3 described above, the present invention includes the air pressure detecting device 40 for detecting the tire air pressure by the tire air pressure detecting device 41 mounted on the rim 53 of the wheel 25 for the motorcycle 10 (refer to FIG. 1). The rim drop section 64 is dented in the shape of a ring and is provided on the inner side of the bead seat sections 62 of the rim 53 for holding the bead sections of the tire. Furthermore, the recessed section 54 is provided on the rim drop section 64, and the detecting device main body 51 of the tire air pressure detecting device 41 is accommodated in the recessed section 54.

By accommodating the detecting device main body 51 in the recessed section 54 of the rim 53, when assembling the tire 26 on the wheel 25 by utilizing a tire changer or the like, or removing the tire 26 from the wheel 25, it is possible to prevent the bead sections of the tire 26 from interfering with the detecting device main body 51. Accordingly, damage of the detecting device main body 51 from the tire changer is prevented.

Referring again to FIG. 3, connected intersection positions 64b and 64b are formed by intersecting side surfaces 54a and 54a of the recessed section 54 and the slant surfaces 64a and 64a of the rim drop section 64 to each other in a peripheral direction and in a width direction. Since a bottom surface 64c of the rim drop section 64 is provided, a distance (radius) from the center of the wheel 25 to the bottom surface 64c is set as R1, and a distance (radius) from the center of the wheel 25 of the bottom surface 54b of the recessed section 54 is set as R2.

Returning to FIG. 2, the detecting device main body 51 is a body formed in the shape of a curve along an inner side surface 53a (that is, a total surface formed by adding the bottom surface 64c of the rim drop section 64 to a bottom surface 54b of the recessed section 54) of the rim 53.

When a radius of an inner surface 51b of the detection device main body 51 is set as R3, and a radius of an outer surface 51a thereof is set as R4, a relationship described hereinafter is satisfied.

$$\leftarrow R4 \leq R1, \uparrow R2 \leq R3, \rightarrow R4 \leq R3$$

For example, if a tire air pressure detecting device 41 is commonly utilized and mounted on a wheel with a rim diameter having a 10 inch–19 inch size (1) the radius R4 of the outer surface 51a of the detecting device main body 51 is set smaller than the radius R1 of the bottom surface 64c of the rim drop section 64 (refer to FIG. 3) of the wheel of 10 inch size of the minimum diameter, even if a tire air pressure detecting mean 41 is mounted on any wheels of 10 inch–19 inch size, the detecting device main body 51 does not protrude outside from the bottom surface 64c of the rim drop section 64. Accordingly, a relationship of R4≦R1 is satisfied.

(2) By setting the radius R3 of an inner surface 51b of the detecting device main body 51 larger than the radius R2 of the bottom surface 54b of the recessed section 54 of the wheel for the maximum diameter 19 inch size, even if the tire air pressure detecting mean 41 is mounted on any wheels of 10 inch–19 inch size, the inner surface 51b of the detecting device main body 51 does not interfere with the bottom surface 54b of the recessed section 54. Accordingly, a relationship of R2≦R3 is satisfied.

(3) When R1 (dimension for wheel of 10 inch size)≦R2 (dimension for wheel of 19 inch size) is established, from the relationships (1) and (2) described above, since R4≦R1≦R2≦R3 is established, a relationship R4≦R3 is satisfied.

As explained in FIG. 2 described above, the present invention includes the air pressure detecting device 40 (refer to FIG. 1) for detecting the tire air pressure by the tire air pressure detecting mean 41 mounted on the rim 53 of the wheel 25 of the motorcycle 10 (refer to FIG. 1). The detecting device main body 51 is a body formed in the shape of a curve along the inner side surface 53a of the rim 53.

By forming the detecting device main body 51 in the shape of a curve along the inner side surface 53a of the rim 53, a projecting section toward a tire 26 (refer to FIG. 1) side of the detecting device main body 51 can be eliminated. Furthermore, when the tire 26 is assembled on the wheel 25 or the tire 26 is removed from the wheel 25, the bead sections of the tire 26 are prevented from interfering with the detecting device main body 51 and damage of the detecting device main body 51 is prevented.

Figure 4:
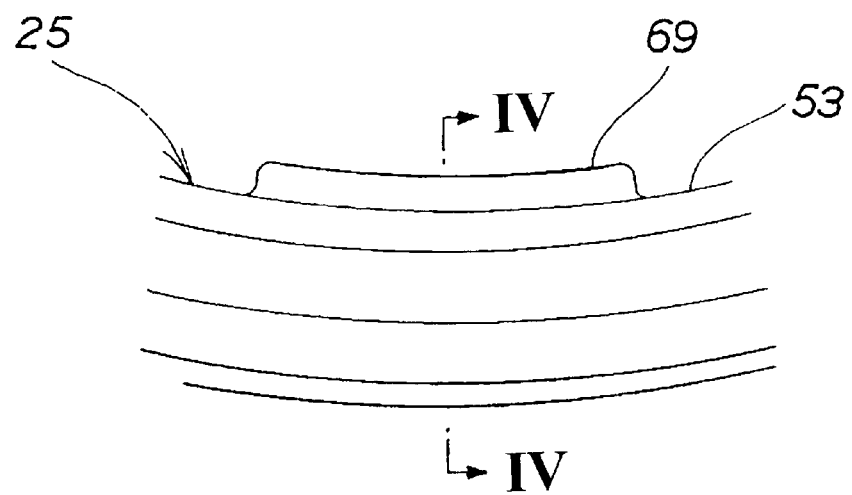
FIG. 4 is a view illustrating a wheel mounted with a tire air pressure detecting device relating to the present invention.
Figure 5:
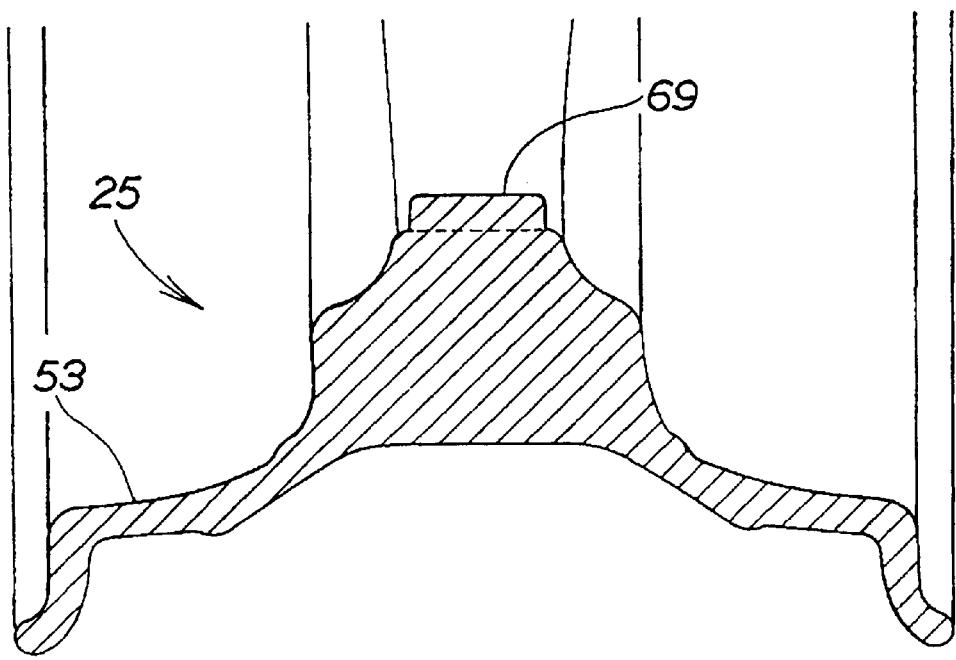
FIG. 5 is a cross-section view along the line IV—IV of FIG. 4.

FIGS. 4 and 5 are views illustrating a wheel mounted with the tire air pressure detecting device relating to the present invention. Specifically, FIG. 4 illustrates a side elevation view, and FIG. 5 illustrates a sectional view taken on line IV—IV of FIG. 4.

In FIG. 4, the wheel 25 is formed with an integrally molded weight section 69 for balancing the tire air pressure detecting device 41 with the rim 53 at a position shifted at an angle of 180° in a peripheral direction from a position mounted with the tire air pressure detecting device 41 (refer to FIG. 3) on the rim 53, that is, from the recessed section 54 (refer to FIG. 3).

FIG. 5 illustrates the weight section 69 projecting from a wheel center side of the rim 53.

As explained hereinbefore, the present invention includes an integrally molded weight section 69 for balancing the tire air pressure detecting device 41 with the rim 53 at the position shifted an angle of 180° in a peripheral direction from the position mounted with the tire air pressure detecting device 41 on the rim 53.

Since the weight section 69 is integrally molded with the rim 53, the necessity of mounting or affixing a specific weight to balance the wheel is eliminated, and workability is improved.

In addition, the tire air pressure detecting device 41 for the front wheel and the tire air pressure detecting device 42 for the rear wheel explained in an embodiment of the present invention may well be the same dimension with each other or may be different from each other according to the size of the tire.

Furthermore, the tire air pressure detecting device 40 can be applied not only to a motorcycle, but to a three-wheeled vehicle or to a four-wheeled vehicle.

The present invention exhibits the following effects according to the constitution described above.

An on vehicle tire air pressure detecting device according to the first aspect of the present invention includes a rim drop section dented in the shape of a ring on an inner side of a bead seat section of a rim. Since a recessed section is provided in the rim drop section, and an air pressure sensor is accommodated in the recessed section, when a tire is assembled to a cast wheel by utilizing a tire changer or the like or when the tire is removed from the cast wheel, the bead sections of the tire are capable of being prevented from interfering with the air pressure sensor, and damage of the air pressure sensor is prevented.

In an on vehicle tire air pressure detecting device according to the second aspect of the present invention, since the air pressure sensor is formed in the shape of a curve along an inner side surface of the rim, a projecting section toward a tire side of the air pressure sensor can be eliminated. Accordingly, when the tire is assembled to a cast wheel, or when the tire is removed from the cast wheel, the bead sections of the tire are prevented from interfering with the air pressure sensor, and damage of the air pressure sensor is prevented.

In a wheel for mounting an on vehicle tire air pressure detecting device according to the third aspect of the present invention, since a weight section is integrally molded with the rim for balancing with an air pressure sensor at a position shifted at an angle of 180° in a peripheral direction from a position where the air pressure sensor is mounted on a rim, a cast wheel can be easily balanced, the necessity to mount or to affix a specific weight in an attempt to balance the wheel is eliminated, and workability is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An on vehicle tire air pressure detecting device for detecting tire air pressure, comprising:
   a rim, said rim including a rim drop section dented in a shape of a ring and provided on an inner side of bead seat sections of the rim for holding bead sections of the tire, said rim drop section being provided with a recessed section, which is radially recessed from said drop section; and
   an air pressure sensor mounted on said rim, said air pressure sensor being accommodated in said recessed section.

2. The on vehicle tire air pressure detecting device for detecting tire air pressure according to claim 1, wherein said air pressure sensor is formed in a shape of a curve along an inner side surface of said rim.

3. The on vehicle tire air pressure detecting device for detecting tire air pressure according to claim 1, wherein said recessed section is formed at an axially center section of said rim drop section, said recessed section extending radially inward from said rim drop section.

4. The on vehicle tire air pressure detecting device for detecting tire air pressure according to claim 2, wherein said recessed section is formed at an axially center section of said rim drop section, said recessed section extending radially inward from said rim drop section.

5. The on vehicle tire air pressure detecting device for detecting tire air pressure according to claim 1, wherein said rim further includes a valve inserting hole within said recessed section, said air pressure sensor including a tire valve attached thereto, said tire valve being inserted through said valve inserting hole.

6. The on vehicle tire air pressure detecting device for detecting tire air pressure according to claim 2, wherein said rim further includes a valve inserting hole within said recessed section, said air pressure sensor including a tire valve attached thereto, said tire valve being inserted through said valve inserting hole.

7. The on vehicle tire air pressure detecting device for detecting tire air pressure according to claim 1, wherein said rim further includes a hump section between said bead set sections and said rim drop section, said rim drop section extending axially inward from said hump section.

8. The on vehicle tire air pressure detecting device for detecting tire air pressure according to claim 2, wherein said rim further includes a hump section between said bead set sections and said rim drop section, said rim drop section extending axially inward from said hump section.

9. A cast wheel for mounting an on vehicle tire air pressure detecting device as set forth in claim 1, comprising:

an integrally molded weight section on said rim for balancing the air pressure sensor, said integrally molded weight section being located at a position shifted at an angle of 180° to a peripheral direction from a position where the air pressure sensor is mounted on the rim.

10. An on vehicle tire air pressure detecting device for detecting a tire air pressure, comprising:

an air pressure sensor mounted on a rim of a vehicular cast wheel, said air pressure sensor being formed in a shape of a curve along an inner side surface of the rim;

said rim including a rim drop section formed in a shape of a ring and provided on an inner side of bead seat sections of the rim for holding bead sections of the tire, said rim drop section being provided with a recessed section, which is radially recessed from said drop section, and said air pressure sensor is accommodated in said recessed section.

11. The on vehicle tire air pressure detecting device for detecting tire air pressure according to claim 10, wherein said recessed section is formed at an axially center section of said rim drop section, said recessed section extending radially inward from said rim drop section.

12. The on vehicle tire air pressure detecting device for detecting tire air pressure according to claim 10, wherein the rim further includes a valve inserting hole within said recessed section, said air pressure sensor including a tire valve attached thereto, said tire valve being inserted through said valve inserting hole.

13. The on vehicle tire air pressure detecting device for detecting tire air pressure according to claim 11, wherein said rim further includes a valve inserting hole within said recessed section, said air pressure sensor including a tire valve attached thereto, said tire valve being inserted through said valve inserting hole.

14. The on vehicle tire air pressure detecting device for detecting tire air pressure according to claim 10, wherein said rim further includes a hump section between said bead set sections and said rim drop section, said rim drop section extending axially inward from said hump section.

15. The on vehicle tire air pressure detecting device for detecting tire air pressure according to claim 11, wherein said rim further includes a hump section between said bead set sections and said rim drop section, said rim drop section extending axially inward from said hump section.

16. A cast wheel for mounting an on vehicle tire air pressure detecting device as set forth in claim 10, comprising:

an integrally molded weight section on said rim for balancing the air pressure sensor, said integrally molded weight section being located at a position shifted at an angle of 180° to a peripheral direction from a position where the air pressure sensor is mounted on the rim.

* * * * *